United States Patent [19]

Mercer

[11] Patent Number: 5,951,912
[45] Date of Patent: Sep. 14, 1999

[54] LIQUID CRYSTAL COMPOSITE AND DEVICE COMPRISING SAME

[75] Inventor: Frank W. Mercer, Belmont, Calif.

[73] Assignee: Raychem Corporation, Menlo Park, Calif.

[21] Appl. No.: 09/127,196

[22] Filed: Jul. 31, 1998

Related U.S. Application Data

[63] Continuation-in-part of application No. 08/907,804, Aug. 8, 1997, abandoned.

[51] Int. Cl.$^6$ .......................... C09K 19/52; C09K 19/54; G02F 1/1333; G02F 1/1343
[52] U.S. Cl. ................................ 252/299.01; 252/299.1; 252/299.5; 349/139
[58] Field of Search ................. 252/299.01, 299.1, 252/299.5; 349/139

[56] References Cited

U.S. PATENT DOCUMENTS

| | | | |
|---|---|---|---|
| 4,950,052 | 8/1990 | Fergason et al. | 350/334 |
| 4,992,201 | 2/1991 | Pearlman | 252/299.1 |
| 5,183,585 | 2/1993 | Koyama et al. | 252/299.01 |
| 5,206,747 | 4/1993 | Wiley et al. | 359/51 |
| 5,395,550 | 3/1995 | Lau | 252/299.01 |
| 5,410,424 | 4/1995 | Konuma et al. | 359/51 |
| 5,427,713 | 6/1995 | Wartenberg et al. | 252/299.5 |
| 5,484,552 | 1/1996 | Wartenberg et al. | 252/299.5 |
| 5,571,448 | 11/1996 | Wartenberg et al. | 252/299.5 |
| 5,695,594 | 12/1997 | Lau et al. | 156/310 |

FOREIGN PATENT DOCUMENTS

| | | | |
|---|---|---|---|
| 0313053 | 4/1989 | European Pat. Off. | G02F 1/133 |
| 0421240 | 4/1991 | European Pat. Off. | G02F 1/1333 |
| 0 764 680 A1 | 3/1997 | European Pat. Off. | C08J 5/18 |
| 1-269922 | 10/1989 | Japan | G02F 1/137 |
| 3-288823 | 12/1991 | Japan | G02F 1/1333 |
| 4-007518 | 1/1992 | Japan | G02F 1/1333 |
| 4-240614 | 8/1992 | Japan | G02F 1/1333 |
| WO 91/01511 | 2/1991 | WIPO | G02F 1/13 |
| WO 92/14184 | 8/1992 | WIPO | G02F 1/133 |
| WO 93/18431 | 9/1993 | WIPO | G02F 1/1333 |
| WO 96/19547 | 6/1996 | WIPO | C09K 19/54 |

OTHER PUBLICATIONS

Derwent WPI 96–446675/45 (abstract of JP 08–220513 (1996), Hitachi Cable).
Derwent WPI 96–017502/02 (abstract of JP 07–292361 (1995), Hitachi Cable).
Derwent WPI 95–234423/31 (abstract of JP 07–140448 (1995), Hitachi Cable).
Derwent WPI 96–452103/45 (abstract of JP 08–227070 (1996), Hitachi Cable).
Dialog JPO&JAPIO 05002291 (abstract of JP 07–294891 (1995), Hitachi Cable).

(List continued on next page.)

*Primary Examiner*—Shean C. Wu
*Attorney, Agent, or Firm*—Herbert G. Burkard; Yuan Chao

[57] ABSTRACT

A liquid crystal device has, as electrooptically active material, a liquid crystal composite including a containment medium, a liquid crystal composition dispersed in the containment medium, and an organotrialkoxysilane additive having the structure

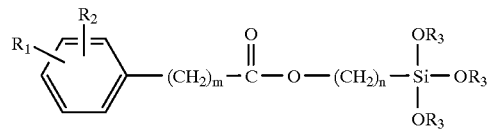

in which $R_1$ and $R_2$ are independently H, F, Cl, $OCH_3$, $OCH_2CH_3$, or a $C_1$ to $C_8$ alkyl, aryl or arylalkyl group; each $R_3$ is independently a $C_1$ to $C_8$ alkyl, aryl, or arylalkyl; m is an integer from 0 to 4; and n is an integer from 2 to 4. The composite can be used for making liquid crystal displays having improved electro-optical properties, in particular a low operating field.

20 Claims, 2 Drawing Sheets

OTHER PUBLICATIONS

Dialog JPO&JAPIO 04932769 (abstract of 07–225369 (1995), Hitachi Cable).

Dialog JPO&JAPIO 05002290 (abstract of JP 07–294890 (1995), Hitachi Cable).

Ono et al., Jpn. J. Appl. Phys., vol. 33 (1994), Part 1, No. 11, pp. 6268–6272 (Nov. 1994).

Adomenas et al., Mol. Cryst. Liq. Cryst. 215, pp. 153–160 (1992).

Derwent WPI 94–051230/07 (abstract of Ricoh KK, JP 06–003652 (1994)).

Schadt et al., J. Chem. Phys. vol. 65 (6), pp. 2224–2230 (1976).

Nomura et al., Jpn. J. Appl. Phys. 30(2), pp. 327–330 (1991).

FIG_1

FIG_2

FIG_3

FIG_3a

LIQUID CRYSTAL COMPOSITE AND DEVICE COMPRISING SAME

CROSS-REFERENCE TO RELATED APPLICATIONS

This application is a continuation-in-part of application Ser. No. 08/907,804, filed Aug. 8, 1997, now abandoned, the disclosure of which is incorporated herein by reference.

BACKGROUND OF THE INVENTION

1. Field of the Invention

This invention relates to liquid crystal composites and liquid crystal devices made from such composites.

2. Description of Related Art

Light valves having an electro-optically active element comprising a liquid crystal composite have been used in displays (both directly driven and active matrix), windows, and privacy panels. In a liquid crystal composite, plural volumes or droplets of a liquid crystal material are dispersed, encapsulated, embedded, or otherwise contained within a matrix material such as a polymer. Exemplary disclosures include Fergason, U.S. Pat. No. 4,435,047 (1984); West et al., U.S. Pat. No. 4,685,771 (1987); Pearlman, U.S. Pat. No. 4,992,201 (1991); Dainippon Ink, EP 0,313,053 (1989).

The liquid crystal composite is disposed between electrodes, which are respectively supported by substrates (e.g., glass or polymer). When no voltage (i.e., no electric field) is applied across the electrodes (the field-off state), incident light is substantially scattered and/or absorbed, creating a frosty or opaque visual appearance. When an appropriate voltage is applied across the electrodes (the field-on state), the liquid crystal composite changes its optical state to one in which incident light is substantially transmitted.

It is desirable that the composite have low light transmissivity in the field-off state ($T_{off}$, as defined hereinbelow), to provide high contrast against the substantially transmissive field-on state. It is also desirable that the composite be switchable from the field-off to the field-on state by the application of as low an electric field as possible. This performance characteristic may be quantitated by the operating field $E_{90}$ (also defined hereinbelow), which measures the electric field required to switch the composite into its substantially transmissive state.

A low $E_{90}$ is desirable because, for a given applied voltage, a thicker layer of composite can be used (resulting in a lower $T_{off}$). Also, in devices such as active matrix displays, the driver controlling the application or not of a voltage across the composite typically is a semiconductor device (e.g., a CMOS chip) having an operating voltage of only several volts. For the driver to successfully control the switching of the composite, the composite must have a low $E_{90}$.

One method employed by researchers in the art to improve the electro-optical performance of a liquid crystal composite, whether that be $T_{off}$, $E_{90}$, or some other parameter, is to include an additive in the composite. Additives which have been used for one purpose or another include polyols, surfactants, polymers of various kinds, amphiphilic telomers, charge transfer complexes, plasticizers, polysilanes, alkyl alcohols, phenolic antioxidants, silicones, crown ethers, acrylates, methacryates, and silane coupling agents. Noteworthy disclosures in the genre include Wartenberg et al., U.S. Pat. No. 5,427,713 (1995); Wartenberg et al., U.S. Pat. No. 5,484,552 (1996); Wartenberg et al., U.S. Pat. No. 5,571,448 (1996); Raychem, WO 96/19547 (1996); Seiko-Epson, JP 3-288823 (1991); Seiko-Epson, JP 4-7518 (1992); Hitachi Cable, JP 7-140448 (1995); Hitachi Cable, JP 7-292361 (1995); Hitachi Cable, JP 7-294,890 (1995); Hitachi Cable, JP 7-294891 (1995); Hitachi Cable, JP 8-220,513 (1996); Hitachi Cable, JP 8-227070 (1996); Adomenas et al., *Mol. Cryst. Liq. Cryst.* 1992, Vol. 215, pp. 153–160; and Sumitomo Electrical Industries, EP 0,421,240 (1990).

However, even though some prior art additives may be successful at reducing $E_{90}$ and/or $T_{off}$, it is difficult to obtain an additive which consistently does so for many different combinations of liquid crystal compositions and matrix materials. Further, an additive which reduces $E_{90}$ may have an adverse effect on $T_{off}$.

BRIEF SUMMARY OF THE INVENTION

An object of the invention is to provide a liquid crystal composite having a reduced operating field $E_{90}$. A further object of the invention is to provide a liquid crystal composite having a reduced operating field $E_{90}$ while having no worse than a minor adverse effect on the field-off transmission $T_{off}$. A further object is to provide devices made from such composites. I have discovered an additive for liquid crystal composites which enables attainment of these and other objects of the invention.

Thus, my invention provides a liquid crystal composite comprising:

(a) a containment medium;

(b) a liquid crystal composition dispersed in the containment medium; and (c) an organotrialkoxysilane additive having the structure I:

wherein $R_1$ and $R_2$ are independently selected from the group consisting of H, F, Cl, $OCH_3$, $OCH_2CH_3$, and $C_1$ to $C_8$ alkyl, aryl or arylalkyl groups; each $R_3$ is independently a $C_1$ to $C_8$ alkyl, aryl, or arylalkyl group; m is an integer from 0 to 4; and n is an integer from 2 to 4.

In another embodiment, my invention provides a liquid crystal device comprising (i) a first electrode;

(ii) a second electrode, at least one of the first and second electrodes being transparent; and (iii) a liquid crystal composite disposed between the electrodes, comprising (a) a containment medium; (b) a liquid crystal composition dispersed in the containment medium; and (c) an organotrialkoxysilane additive having the structure I.

Organotrialkoxylsilane additive I may be used in combination with at least one second additive, which can be an organotrialkoxysilane IIA, an diorganodialkoxysilane IIB, or a tetraalkoxysilane IIc, having respectively the structures:

wherein $R_4$ is a $C_1$ to $C_{18}$ alkyl, aryl, or arylalkyl group; and each $R_5$ is independently a $C_1$ to $C_8$ alkyl, aryl, or arylalkyl group;

wherein each $R_6$ is independently a $C_1$ to $C_{18}$ alkyl, aryl, or arylalkyl group; and each $R_7$ is independently a $C_1$ to $C_8$ alkyl, aryl, or arylalkyl group;

wherein each $R_8$ is independently a $C_1$ to $C_8$ alkyl, aryl, or arylalkyl group.

BRIEF DESCRIPTION OF THE DRAWING(S)

Herein, reference numbers repeated from one figure to another denote the same or like elements.

DETAILED DESCRIPTION OF THE INVENTION

I have discovered that the electro-optical properties of a liquid crystal composite may be improved by the inclusion therein of an organotrialkoxysilane additive I where $R_1$, $R_2$, $R_3$, m, and n are as previously defined. $R_1$ and $R_2$ are selected independently of each other; i.e., they may be the same or different. Similarly, each $R_3$ is selected independently of each other; i.e., the $R_3$'s may be the same or different. Illustrative suitable $C_1$ to $C_8$ alkyl, aryl, or arylalkyl groups for $R_1$, $R_2$, and $R_3$ are $CH_3$, $CH_2CH_3$, $CH_2CH_2CH_3$, $CH(CH_3)_2$, $CH_2CH_2CH_2CH_3$, $CH_2CH(CH_3)_2$, $CH(CH_3)CH_2CH_3$, $C(CH_3)_3$, $C_6H_5$, and $CH_2C_6H_5$. In preferred embodiments, $R_1$ and $R_2$ are H, $CH_3$, or F; each $R_3$ is the same and is $CH_3$ or $CH_2CH_3$; m is 0 or 1; and n is 3 or 4. Preferably, $R_1$ is a para-substituent while $R_2$ is an ortho-substituent. Where $R_1$, $R_2$, or $R_3$ is any aryl or arylalkyl group, the aryl moiety may be substituted or unsubstituted. The preference for each $R_3$ as being the same is based on convenience of synthesis.

Organotrialkoxysilane additive I may be synthesized from a precursor unsaturated ester V, which in turn may be synthesized by the acid-catalyzed esterification of carboxylic acid III and alcohol IV:

Unsaturated ester V is then coupled with a trialkoxysilane VI in a platinum-catalyzed hydrosilation reaction to yield additive I:

Where n is 2, unsaturated ester V can be synthesized by other techniques known in the synthetic chemical art or obtained from commercial sources. For example, vinyl benzoate is a commercially available.

A mixture of different additives I may be used. Alternatively, additive I may be used in combination with other additives. It has been discovered that, in some instances, electro-optical performance is improved by using additive I in combination with a second additive IIA, IIB, or IIC, respectively having the structures where $R_4$, $R_5$, $R_6$, $R_7$ and $R_8$ are as previously defined. Illustrative suitable groups $R_4$ or $R_6$ include but are not limited to methyl, ethyl, n-propyl, n-butyl, n-hexyl, n-octyl, n-octadecyl, cyclopentyl, phenyl, 2-phenylethyl, 3-acetoxypropyl, 3-benzoyloxypropyl, 3-cyanopropyl, and the like. Illustrative suitable groups $R_5$, $R_7$ or $R_8$ include but are not limited to $CH_3$, $CH_2CH_3$, $CH_2CH_2CH_3$, $CH(CH_3)_2$, $CH_2CH_2CH_2CH_3$, $CH_2CH(CH_3)_2$, $CH(CH_3)CH_2CH_3$, and $C(CH_3)_3$. Preferably, each $R_5$, $R_7$ or $R_8$ is the same and is either $CH_3$ or $CH_2CH_3$. While each $R_6$ may be the same, they need not be so. The selection of each $R_5$, $R_7$, or $R_8$ being the same in the second additives is typically made as a matter of synthetic convenience in their preparation. Preferred tetraalkoxysilanes IIC are tetraethoxysilane and tetramethoxysilane.

Additive I and second additives IIA, IIB, and/or IIC (where used) are used in ratios of 10:1 to 1:10 weight:weight. The use of one second additive is not exclusive of the use of other second additives; combinations comprising an additive I and one or more second additives may be used. Typical weight ratios of additives (I, plus IIA, IIB and/or IIC where used) to liquid crystal composition are between 1:10 and 1:1.

Without being bound by theory, it is my belief that the alkoxysilyl groups of additive I (or second additives IIA, IIB and/or IIC, if present) polymerize in the presence of moisture (water) and anchor themselves at the interface between the liquid crystal composition and the containment medium. The moisture may derive from an aqueous carrier medium when the liquid crystal composite is made by an emulsion process as described hereinbelow, from adventitious atmospheric moisture, or from some other source. The amount required is small. The alignment of a liquid crystal composition and the ease—or difficulty—with which such alignment can be altered are highly dependent on the nature of the interface. The presence of the additive(s) at the interface affects one or both parameters. Inasmuch as the electro-optical properties of a liquid crystal composite in turn depend on the shifting of the liquid crystal composition from one alignment to another, they can be profoundly affected by additives at the interface. The additives of my invention are to be distinguished from traditional silane coupling agents, which have two reactive groups per molecule, one of which is a trialkoxysilane group. The trialkoxysilane group is designed to react with any glass surface present. The other reactive group, which may be, for example, a vinyl, allyl, amine, epoxy, hydroxyl, etc., group, reacts with the containment medium. For example, if the containment medium is an epoxy resin, an amine-containing silane coupling agent might be used. The additives of my invention lack such second reactive group.

In an liquid crystal composite, discrete volumes of a liquid crystal composition are encapsulated, dispersed, embedded or otherwise contained in a containment medium or matrix. The volumes are not necessarily limited to spherical or substantially spherical ones. They may be irregularly shaped, and even interconnected. The amount of interconnection between volumes may be to an extent such that the liquid crystals appear to form a continuous phase. "Liquid crystal composition" denotes a composition having liquid crystalline properties, whether that composition consists of a single discrete liquid crystalline compound, a mixture of different liquid crystalline compounds, or a mixture of liquid crystalline and non-liquid crystalline compounds. Preferably, the liquid crystal composition is nematic or operationally nematic. More preferably, it also has a positive dielectric anisotropy.

Individual liquid crystal molecules typically have elongated shapes, with a tendency to align themselves with their long molecular axes parallel to each other. This alignment causes a liquid crystal composition to be anisotropic, meaning that its measured physical, optical, and other properties are dependent on the direction of measurement (parallel or perpendicular to the direction of alignment). The alignment direction can be influenced by an external stimulus, such as an electrical or magnetic field, causing the liquid crystal composition to exhibit a particular value of a physical characteristic in one direction when the stimulus is absent, but rapidly switching to a different value when the stimulus is applied. It is because of this anisotropy and its ready realignment that liquid crystal compositions are useful as materials for displays. Those skilled in the art will understand that liquid crystal compositions used in displays generally do not consist of a single discrete compound, but are mixtures of different discrete liquid crystal compounds.

The liquid crystal composition may have a low cyano content, i.e., less than 1.8 meq/g cyano groups (more preferably less than 0.5 meq/g). If so, it is preferred that the liquid crystal composition be substantially free of cyano groups or consists essentially of compounds free of cyano groups. Such liquid crystal compositions are taught in Kamath et al., U.S. Pat. No. 5,233,445 (1993), the disclosure of which is incorporated herein by reference.

The containment medium is preferably a polymeric material. Suitable containment media include but are not limited to poly(vinyl alcohol) ("PVA") and its copolymers, gelatin, polyurethane, latexes, poly(ethylene oxide), poly(vinyl pyrrolidone), cellulosic polymers, natural gums, acrylic and methacrylic polymers and copolymers, epoxies, polyolefins, vinyl polymers, and the like. PVA and polyurethane are preferred containment media, because they lead to liquid crystal composites which are most amenable to exhibiting improved electro-optical properties as a result of use of additives I, alone or in combination with second additives IIA, IIB and/or IIC.

Liquid crystal composites of this invention may be formed by deposition from an aqueous emulsion containing both the containment medium and the liquid crystal composition, in the presence of a carrier medium. The emulsion may be made with apparatus such as propeller blade mixers, vortex mixers, colloid mixers, and the like. Additive I (and IIA or IIB, if used) may be added to either the containment medium or the liquid crystal composition, or both, and either before or after the emulsion is formed, or during the formation process. Preferred emulsion techniques are taught in Fergason, U.S. Pat. No. 4,435,047 (1984), U.S. Pat. No. 4,606,611 (1986), U.S. Pat. No. 4,616,903 (1986), and U.S. Pat. No. 4,707,080 (1987); Pearlman et al., U.S. Pat. No. 4,992,201 (1991); Wartenberg et al., U.S. Pat. No. 5,202,063 (1993); Reamney, U.S. Pat. No. 5,335,101 (1994); Reamey et al., U.S. Pat. No. 5,405,551 (1995); and Havens et al., U.S. Pat. No. 5,585,947 (1996); the disclosures of which are incorporated herein by reference.

Liquid crystal composites of this invention may also be made by phase separation techniques. In one embodiment, a solvent is evaporated from a homogeneous solution containing both containment medium and the liquid crystal composition. In another embodiment, an initially homogeneous mixture containing both containment medium and liquid crystal composition is heated to an elevated temperature, then cooled to phase-separate out liquid crystal volumes contained in the containment medium. Further, it may be formed by an in-situ polymerization process, in which a precursor of the containment medium (e.g., a polymerizable monomer) is polymerized and simultaneously encapsulates a liquid crystal composition as it phase separates. The liquid crystal composition need not be entirely surrounded by the polymer, and may exist as part of a system with co-continuous phases. Preferred phase separation techniques are taught in Wu et al., U.S. Pat. No. 4,671,618 (1987); West et al., U.S. Pat. No. 4,673,255 (1987) and U.S. Pat. No. 4,685,771 (1987); Doane et al., U.S. Pat. No. 4,688,900 (1987); and Dainippon Ink and Chemicals, EP 0,313,053 (1989); the disclosures of which are incorporated herein by reference.

Typically, a liquid crystal composite is substantially non-transparent in the absence of an electric field (the "field-off" state) and substantially transparent in the presence of a sufficient electric field (or "field-on" state). The electric field induces a change in the alignment of the liquid crystal molecules in the liquid crystal composition, in turn causing the liquid crystal composite to switch from a highly light-scattering (and/or absorbent) state to a highly non-scattering (and/or non-absorbent) and substantially transparent state. Generally, it is preferred that the liquid crystal composition have a positive dielectric anisotropy and that the ordinary refractive index of the liquid crystal composition be matched with the refractive index of the containment medium, while the extraordinary refractive index is substantially mismatched therewith. There is further scattering which may occur due to the different liquid crystal alignments in neighboring droplets. If this is the dominant mode of scattering, the requirement for refractive index matching may be relaxed. The principles of operation of liquid crystal composites are further described in the aforementioned references, particularly the Fergason patents. In those portions of the liquid crystal composite to which a sufficient electric field is applied, the transition from a non-transparent state to a transparent state occurs, while adjacent areas to which no electric field has been applied remain non-transparent.

Figure 1:
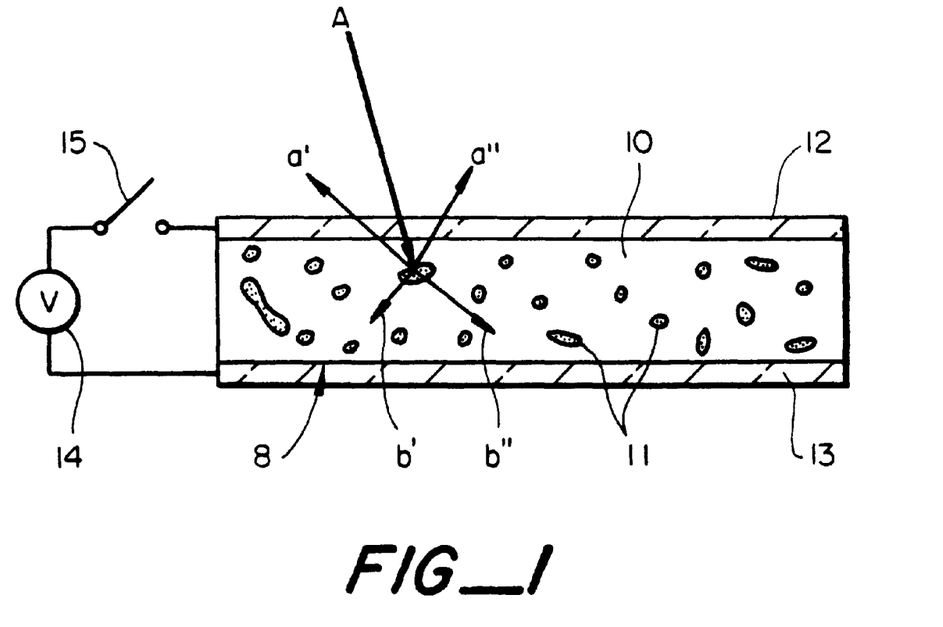
FIGS. 1 and 2 illustrate the operation of a liquid crystal display comprising a liquid crystal composite.
Figure 2:
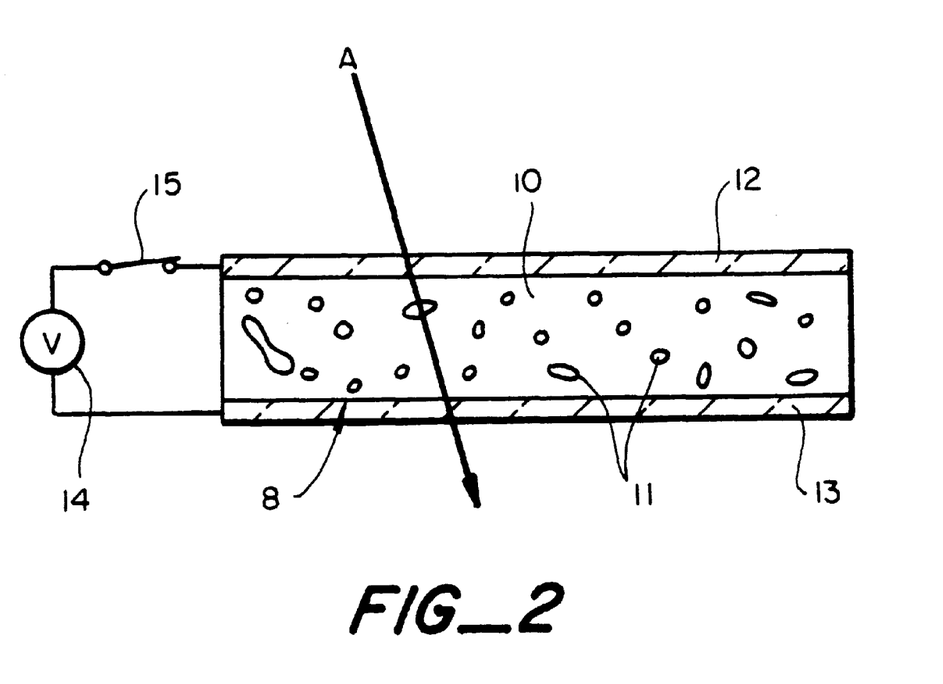

The principle of operation of a liquid crystal composite is illustrated in FIGS. 1 and 2. Liquid crystal composite 8 comprises a containment medium 10 having distributed therein plural volumes of liquid crystal composition 11 and is positioned between top and bottom electrodes 12 and 13, made for example of indium tin oxide ("ITO") or a thin metal coating. Top and bottom electrodes 12 and 13 (together with liquid crystal composite 8) may be supported by respective top and bottom support sheets, not shown. The support sheets may be made of a transparent material such as glass or polymer (preferably poly(ethylene terephthalate) ("PET")). A voltage source 14 is connected to electrodes 12 and 13, but with switch 15 in the open position (FIG. 1), no voltage is applied across liquid crystal composite 8. Incident light (ray A) is scattered, both backward (rays a' and a") and forward (rays b' and b"). When switch 15 is closed (FIG. 2), a voltage is applied across liquid crystal composite 8, causing molecules in liquid crystal composition 11 to align their long molecular axes with the field of the applied voltage. Owing to the match between the refractive index of containment medium 10 and the ordinary refractive index of liquid crystal composition 11, incident light (ray A) is not scattered, but is transmitted through liquid crystal composite 8. If both electrodes 12 and 13 are transparent and the viewer is positioned on the side of electrode 13, i.e., opposite the incident light, the display operates as a transmissive display. If a reflector is positioned behind the display, on the side of electrode 13, or if electrode itself 13 is reflective, then the display operates as a reflective display. Thus, at least one of electrodes 12 and 13 should be transparent. If the electrodes are patterned, or if plural electrodes are used, then selected portions of the liquid crystal composite may be switched as individual pixel elements which can be combined to form complex graphics or text images, even at a high resolution level.

Pleochroic dyes have been mixed with liquid crystals to form a solution therewith. The pleochroic dye molecules generally align with the liquid crystal molecules, so that the application of the electric field affects not only the predominant alignment of the liquid crystals, but also that of the pleochroic dye. As the extent of the absorption of incident light by the pleochroic dye depends on its orientation relative to the incident light, the application of an external stimulus to a liquid crystal-pleochroic dye combination provides a mechanism for the controlled attenuation of light by absorption. (Thus, as used herein, the term "liquid crystal composition" also means, in context, a liquid crystal composition containing pleochroic dye dissolved therein.) Pleochroic dyes may thus be used in liquid crystal composites to form colored displays. A display capable of displaying colored images may be formed by depositing side by side red, blue, and green pixels made from liquid crystal composites of the corresponding color.

Figure 3:
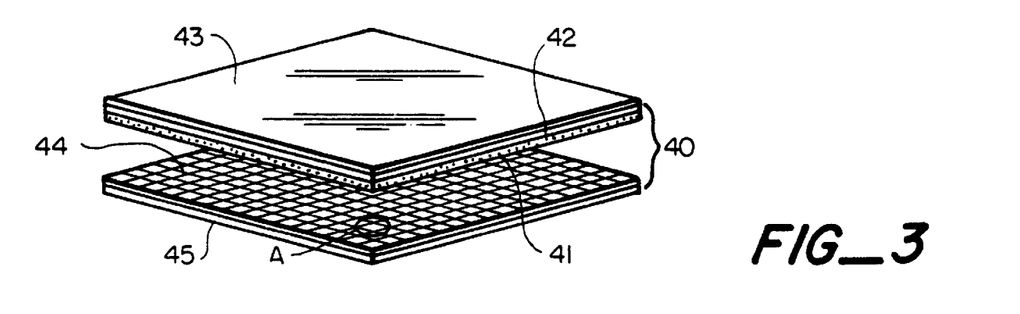
FIGS. 3 and 3a illustrate an active matrix suitable for driving pixel elements formed from liquid crystal composites of this invention.
Figure 3A:
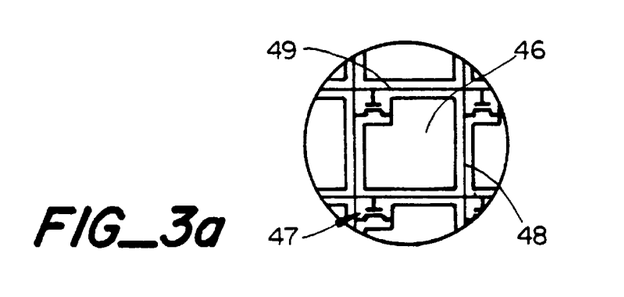

The addressing of pixel elements can be controlled by active matrix switching means such as thin film transistors (TFT's) or metal-insulator-metal diodes. Preferably, they are addressed in a multiplex fashion, using an array of multiplexed active matrix switching means. Such a scheme is illustrated in FIGS. 3 and 3b, in an exploded view, with TFT's as the active matrix switching elements. FIG. 3 depicts a sandwich 40 of liquid crystal composite 41 between a first support material 43 (e.g., glass) coated with a transparent ground plane electrode 42 (made for example from ITO) and a second support material 45 (typically glass) having thereon an array 44 of multiplexed TFT's. The construction of the array is shown in greater detail in FIG. 3b, corresponding to a magnification of the portion of FIG. 3 labeled A. Each pixel is defined by an electrode 46 (made for example from ITO). The application of a voltage across each electrode 46 is controlled by a TFT 47. In turn, each TFT is addressed in a multiplexed fashion via scan line 49 and data line 48. The TFT serves to control the addressing of each pixel and prevent cross-talk between adjacent pixels. Alternatively, the active matrix may be a CMOS chip. Such a multiplexing method is called active matrix multiplexing.

An alternative, but less preferred multiplexing method is passive multiplexing, using a set of M row electrodes in conjunction with a set of N column electrodes. By applying the proper electrical signals to, for example, the 5th row and 8th column electrodes, the pixel at the 5th row and 8th column can be switched on and off. In this way, the number of electrode leads can be reduced from M×N to M+N. However, the adjacent pixels are not independent of each other. When a voltage sufficient to switch the 5th row-8th column pixel is applied, the adjacent pixels (e.g., the 4th row-8th column pixel) also experience a substantial voltage and can also be inadvertently switched, at least partially, leading to cross-talk.

To provide a background for the comparison of the electro-optical properties of liquid crystal composites of this invention against reference liquid crystal composites, a brief discussion of electro-optical properties and their method of measurement follows.

Optical measurements were obtained with f/3.5 collection optics and a collimated 550±40 nm light source. In order to measure $T_{90}$ and the operating field $E_{90}$ of a liquid crystal composite, samples were stepped up and down in voltage (25 steps up and 25 steps down with 0.7 sec per step) to a relatively high field (typically 8–10 V/μm). For each test, the maximum in transmission is defined as $T_{on}$, while $T_{off}$ is the percent transmission in the absence of applied voltage. The value $T_{90}$ is given by the equation $$T_{90}=0.9(T_{on}-T_{off})+T_{off}$$

The applied field needed to reach $T_{90}$ on the up curve is $V_{90}$ (the up curve being the % T/V curve obtained with increasing voltage). The operating field $E_{90}$ (in Volt/μm) is defined by $$E_{90}=V_{90}/t$$

where $V_{90}$ is in volts and t is the thickness in μm of the liquid crystal composite. (It is possible to reduce the voltage needed to operate a liquid crystal light valve by reducing the thickness of the liquid crystal layer. But then properties such as contrast ratio suffer. A fairer measurement is the operating field $E_{90}$, which is normalized for device thickness.)

The practice of my invention may be further comprehended by reference to the following working examples, which are provided for illustrating it, and not for delimiting it.

EXAMPLE 1

The following representative procedure is written with specific reference to the preparation of a specific additive I, but those skilled in the art will appreciate that it is adaptable to the preparation of other additives I.

To a 250 mL round bottom flask equipped with a reflux condensor was added 25 g of benzoic acid, 51 g of allyl alcohol, and 2.5 g of sulfuric acid. The mixture was heated at reflux for 17 hr, allowed to cool to room temperature, and 50 g of toluene was added. Using a 1 L separatory funnel, the mixture was washed once with 100 mL of water, once with 50 mL of 5 wt % $Na_2CO_3$ in water, and once more with 100 mL of water. The organic phase was dried over $Na_2SO_4$, filtered and distilled to yield allyl benzoate. The allyl benzoate distilled at a boiling point of 135° C. at about 60 mm Hg.

To a 50 mL round bottom flask was added 5.1 g of allyl benzoate, 5.3 g of triethoxysilane, and 3 drops of 10 wt % chloroplatinic acid in isopropyl alcohol. The flask was partially immersed in a room temperature water bath to cool the mixture in the event of an exothermic reaction. The mixture was stirred for 18 hr at room temperature (about 25° C.). The mixture was purified using a Kugelrohr short path distillation apparatus at 1 mm Hg and 125° C. to yield additive Ia (3-benzoyloxypropyltriethoxysilane).

Additional organotrialkoxysilane additives Ib–If were obtained. Additive Ib was custom synthesized by a commercial supplier (Gelest, Inc., Tullytown, Pa.). Additives Ic–If were prepared by following the above procedure, *mutatis mutandis*.

EXAMPLE 2

This example illustrates the preparation liquid crystal light valves comprising a liquid crystal composite in accordance with this invention.

To a 30 mL plastic beaker was added 0.825 g of additive Ia and 0.029 g of dibutyltin dilaurate which was mixed for 20 sec using a vortex mixer. To this mixture was added 4.156 g of BL093 liquid crystal (BDH Ltd., Poole, England) and the mixture was mixed for an additional 30 sec on the vortex mixer. To the resulting mixture was added 9.260 g of a 12.55 wt % aqueous solution of Airvol 205 poly(vinyl alcohol) (Air Products) and the composition was emulsified using a Dayton mixer model 2M037A powered at 25 volts for 5 min. The volume median droplet diameter was determined by a Coulter Counter to be about 2.6 microns volume percent median. The resulting emulsion was transferred to a 15 mL vial, sealed, placed on a tumbler at room temperature and allowed to cure for 2 days. The emulsion was filtered through an 8 μm filter and coated onto indium tin oxide coated poly(ethylene terephthalate) polyester film (ITO/PE). The emulsion was allowed to air dry for 30 minutes and a layer of ITO/PE was laminated to the coating. The dried coating had a thickness of 8.75 μm.

The electro-optical properties of a control sample (no additive I) and liquid crystal light valves containing additives I are summarized in Table A.

TABLE A

Electro-Optical Properties of Liquid Crystal Light Valves

| Compound I Added | Operating Field $E_{90}$ (Volt/μm) | Field-off Transmission $T_{off}$ (%) |
|---|---|---|
| None (control) | 5.2 | 5 |
| Ia | 0.65 | 6 |
| Ib | 0.65 | 6 |
| Ic | 0.8 | 5 |
| Id | 1.0 | 5 |
| Ie | 0.7 | 6 |
| If | 1.0 | 4 |

The above results show that when additives I are present, they substantially lower the operating field $E_{90}$ without adversely affecting the field-off transmission $T_{off}$.

EXAMPLE 3

In this example a mixture of silane additives I and IIB was used to prepare an emulsion. To a 30 mL plastic beaker was added 0.701 g of additive Ia, 0.098 g of phenylmethyldiethoxysilane (Gelest) and 0.025 g dibutyltin dilaurate which was mixed for 20 seconds using a vortex mixer. To this mixture was added 4.030 g of BL093 liquid crystal and the mixture was mixed for an additional 30 seconds on the vortex mixer. To the resulting mixture was added 9.117 g of a 12.55 wt % aqueous solution of Airvol 205 poly(vinyl alcohol) and the composition was emulsified using a Dayton mixer model 2M037A powered at 25 volts for 5 minutes. The volume median droplet diameter was determined by a Coulter Counter to be about 2.5 microns volume percent median. The resulting emulsion was transferred to a 15 mL vial, sealed, placed on a tumbler at room temperature and allowed to cure for 4 days. The emulsion was filtered through an 8 micron filter and coated onto indium tin oxide coated PET polyester film (ITO/PE). The emulsion was allowed to air dry for 30 minutes and a layer of ITO/PE was laminated to the coating. The dried coating had a thickness of 8.06 microns. The sample was heat aged for 4 days at 60° C. and displayed an $E_{90}$ of 0.68 volts/micron and a $T_{off}$ of 6%.

EXAMPLE 4

This example illustrates the invention, with Neorez polyurethane as the containment medium and with a dye added. A composition of liquid crystal and dye ("LC/dye") was prepared by weighing 0.12 g GX874 dye (Showa Kato Ltd., Japan), 0.30 g G 241 dye (Showa Kato Ltd., Japan), 0.18 g G 207 dye (Showa Kato Ltd., Japan), and 19.4 g BL093 liquid crystal into a glass vial. The mixture was stirred with a magnetic stir bar for about 48 hrs at 60–65° C., followed by stirring at room temperature for an additional 2 days.

To a 30 mL plastic beaker was added 1.008 g of additive Ib and 0.029 g dibutyltin dilaurate which was mixed for 20 seconds using a vortex mixer. To this mixture was added 3.014 g of the LC/dye composition and 0.061 g of Dow 5098 surfactant. The mixture was mixed for an additional 30 seconds on the vortex mixer. To the resulting mixture was added 5.337 g of Neorez R967 urethane latex (Zeneca Resins) and the composition was emulsified using a Dayton mixer model 2M037A powered at 52 volts for 1 minute. The volume median droplet diameter was determined by a Coulter Counter to be about 2.0 microns volume percent median. To a 6.671 gram sample of the emulsion in a 15 mL glass vial was added 3.341 g of water, the composition was shaken by hand to disperse the water into the emulsion, and the composition was heated at 60° C. for 40 hours. To a 10 mL vial was added 4.01 g of the cured emulsion and 0.167 g of a 50 wt % solution of CX-100 (Zeneca Resins). The emulsion was mixed on a vortex mixer for 20 seconds, filtered through an 8 micron filter, and coated onto indium tin oxide coated PET polyester film (ITO/PE). The emulsion was allowed to air dry for 30 minutes and a second layer of ITO/PE was laminated to the coating. The laminate was cured for 3 days at 60° C. The dried coating had a thickness of 8.75 microns and displayed an $E_{90}$ of 0.95 volts/micron and a $T_{off}$ of 26%. A similar device was prepared in a similar manner but without addition of any silane additive and had an $E_{90}$ of 2.34 volts/micron and a $T_{off}$ of 34%.

EXAMPLE 5

A series of formulations were also prepared using the general procedure described in Example 4 using mixtures of additive Ib and various trialkoxysilane additives IIA, at a weight ratio of 4 to 1, respectively. Results of electro-optical testing is listed below. (The $E_{90}$ and $T_{off}$ values are higher than those reported in prior examples; this is a general effect attributable to the use in this example of polyurethane as the containment medium (as opposed to poly(vinyl alcohol), as in some prior examples) and to the presence of a dye.)

TABLE B

Devices Using Both Additives I and IIA

| | Additive IIA | | Device Characteristics | |
|---|---|---|---|---|
| Ref. | $R_4$ | $R_5$ | Operating Field $E_{90}$ (V/μm) | Field-off Transmission $T_{off}$ (%) |
| 1 | None | None | 0.93 | 25 |
| 2 | n-Butyl | Methyl (all 3) | not measured | transparent |
| 3 | n-Hexyl | Methyl (all 3) | not measured | transparent |
| 4 | n-Octyl | Ethyl (all 3) | not measured | transparent |
| 5 | n-Octadecyl | Methyl (all 3) | not measured | transparent |
| 6 | Cyclopentyl | Methyl (all 3) | 0.72 | 32 |
| 7 | Phenyl | Ethyl (all 3) | 0.92 | 21 |
| 8 | 2-Phenylethyl | Methyl (all 3) | 0.80 | 29 |
| 9 | 3-Acetoxypropyl | Methyl (all 3) | 1.14 | 20 |
| 10 | 3-Cyanopropyl | Methyl (all 3) | 0.65 | 33 |

EXAMPLE 6

A dialkyldialkoxysilane additive IIB, 3-benzoyloxypropylmethyldiethoxysilane, was synthesized as follows: To a 50 mL round bottom flask was added 5.1 g of allyl benzoate, 5.1 g of methyldiethoxysilane, and 3 drops of 10 wt % chloroplatinic acid in isopropyl alcohol. The flask was partially immersed in a room temperature water bath to cool the mixture in the event of an exothermic reaction. The mixture was allowed to stir for 18 hours at room temperature. The mixture was purified using a Kugelrohr short path distillation apparatus at 1 mm at 125° C. to yield 3-benzoyloxpropylmethyldiethoxysilane.

A liquid crystal device was prepared with PVA as the containment medium, in a manner similar to Example 3, using the above additive IIB and additive Ie. The ratio of additive Ie and additive IIB was 7:1. The device had an $E_{90}$ of 0.67 V/micron and a $T_{off}$ of 6%.

EXAMPLE 7

This example illustrates the invention regarding the use of a tetraalkoxysilane IIC as a second additive.

A series of NCAP devices containing Neorez polyurethane, arylester trialkoxysilanes, and tetraethoxysilane were prepared. Samples prepared containing a mixture of 3-benzoyloxpropyltriethoxysilane (BPTMS) and tetraethoxysilane displayed the best electro-optic properties and excellent heat aging. Below is a general procedure for preparing the devices and the results of electro-optic testing.

A composition of liquid crystal and dye (LC/dye) was prepared by weighing 0.16 g GX874 dye (Showa Kato Ltd., Japan), 0.4 g G 241 dye (Showa Kato Ltd., Japan), 0.24 g G 207 dye (Showa Kato Ltd., Japan), and 19.4 g BL093 liquid crystal into a glass vial. The mixture was stirred with a magnetic stir bar for about 48 hr at 60–65° C. The mixture was stirred at room temperature for an additional 2 days.

To a 100 mL plastic beaker was added 3.66 g of BPTMS, 0.52 g tetraethoxysilane and 0.065 g dibutyltin dilaurate, which was mixed for 20 seconds using a vortex mixer. To this mixture was added 14.63 g of the LC/dye composition and the mixture was mixed for an additional 30 seconds in the vortex mixer. To the resulting mixture was added 38.9 g of a 12.8 wt % solution of Airvol 205 polyvinyl alcohol (PVA, Air Products) and the composition was emulsified using a Dayton mixer model 2M037A powered at 25 volts for 5 min. The composition was emulsified using the Dayton mixer powered at 30 volts for 5 minutes followed by 2 minutes at 32 volts. The volume median droplet diameter was determined by a Coulter Counter to be about 2.0 microns volume percent median. The emulsion was transferred to a glass bottle and cured by heating at 60° C. for 48 hours.

The cured emulsion was sub-divided into approximately 25 g aliquots, diluted to 100 mL with deionized water and gently mixed in 100 mL Beckman polypropylene tubes (total of 4 tubes). Samples were centrifuged at 2000 rpm for 22 HR using a Beckman JA-18 rotor at 25° C. The supernatant liquids were discarded and the pellets were re-suspended in approximately 85 g of deionized $H_2O$ with gentle mixing to remove residual PVA in the pellets. Each sample was centrifuged a second time for one hr at 5000 rpm to remove aqueous PVA. The supernatant liquids were again discarded and the pellets (each pellet was approximately 9 g in weight) were re-suspended in approximately 4.3 g of Neorez R967 polyurethane latex (Zeneca Resins)

To a 10 mL vial was added 4.01 g of the emulsion and 0.167 g of a 50 wt % solution of CX-100 aziridine crosslinking agent for polyurethane (Zeneca Resins). The emulsion was mixed on a vortex mixer for 20 sec, filtered through an 8 micron filter, and coated onto indium tin oxide coated polyester film (ITO/PE). The emulsion was allowed to air dry for 30 minutes and a second layer of ITO/PE was laminated to the coating. The laminate was cured for 3 days at 60° C. The dried coating had a thickness of 6.1 microns and displayed an $E_{90}$ of 0.71 volt/micron and a $T_{off}$ of 15%. The samples were aged for 6 days at 60° C. at 90% relative humidity and the electro-optic properties were measured again. After aging, the sample displayed an $E_{90}$ of 0.75 volt/micron and a $T_{off}$ of 19%.

Examples 3 through 7 show that the use of a second additive IIA, IIB, or IIC in combination with an additive I can further lower the operating field $E_{90}$ without significantly negatively affecting field-off transmission $T_{off}$. However, the use of a second additive is not always beneficial, and in some instances may lead to unusable composites which are transparent in the field-off state. However, those skilled in the art will be able to determine empirically, by reference to the teachings herein, when a second additive is beneficial or not.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure, such feature can also be used, to the extent appropriate, in the context of another figure, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. A liquid crystal composite comprising:
 (a) a containment medium;
 (b) a liquid crystal composition dispersed in the containment medium; and
 (c) an organotrialkoxysilane additive having the structure:

wherein $R_1$ and $R_2$ are independently selected from the group consisting of H, F, Cl, $OCH_3$, $OCH_2CH_3$, and $C_1$ to $C_8$ alkyl, aryl or arylalkyl groups; each $R_3$ is independently a $C_1$ to $C_8$ alkyl, aryl, or arylalkyl group; m is an integer from 0 to 4; and n is an integer from 2 to 4.

2. A liquid crystal composite according to claim 1, wherein $R_1$ and $R_2$ are independently H, $CH_3$, or F.

3. A liquid crystal composite according to claim 1, wherein each $R_3$ is the same and is $CH_3$ or $CH_2CH_3$.

4. A liquid crystal composite according to claim 1, wherein m is 0 or 1.

5. A liquid crystal composite according to claim 1, wherein n is 3 or 4.

6. A liquid crystal composite according to claim 1, wherein the organotrialkoxysilane has the structure 7. A liquid crystal composite according to claim 1, further comprising at least one second additive having the structure wherein $R_4$ is a $C_1$ to $C_{18}$ alkyl, aryl, or arylalkyl group; each $R_5$ is independently a $C_1$ to $C_8$ alkyl, aryl, or arylalkyl group; each $R_6$ is independently a $C_1$ to $C_{18}$ alkyl, aryl, or arylalkyl group; each $R_7$ is independently a $C_1$ to $C_8$ alkyl, aryl, or arylalkyl group; and each $R_8$ is independently a $C_1$ to $C_8$ alkyl, aryl, or arylalkyl group.

8. A liquid crystal composite according to claim 7, wherein $R_5$ and $R_7$ are selected from the group consisting of $CH_3$, $CH_2CH_3$, $CH_2CH_2CH_3$, $CH(CH_3)_2$, $CH_2CH_2CH_2CH_3$, $CH_2CH(CH_3)_2$, $CH(CH_3)CH_2CH_3$, $C(CH_3)_3$, $C_6H_5$, and $CH_2C_6H_5$.

9. A liquid crystal composite according to claim 7, wherein $R_4$ or $R_6$ are selected from the group consisting of methyl, ethyl, n-propyl, n-butyl, n-hexyl, n-octyl, n-octadecyl, cyclopentyl, phenyl, 2-phenylethyl, 3-acetoxypropyl, and 3-cyanopropyl.

10. A liquid crystal composite according to claim 1, wherein the containment medium is poly(vinyl alcohol) or polyurethane.

11. A liquid crystal composite according to claim 1, wherein the liquid crystal composition is operationally nematic and has a positive dielectric anisotropy.

12. A liquid crystal composite according to claim 1, wherein the liquid crystal composition has a cyano content of less that 1.8 meq/g.

13. A liquid crystal composite according to claim 1, wherein the liquid crystal composition further includes a pleochroic dye.

14. A liquid crystal device comprising
   (i) a first electrode;
   (ii) a second electrode, at least one of the first and second electrodes being transparent; and
   (iii) a liquid crystal composite disposed between the electrodes, comprising (a) a containment medium; (b) a liquid crystal composition dispersed in the containment medium; and (c) an organotrialkoxysilane additive having the structure wherein $R_1$ and $R_2$ are independently selected from the group consisting of H, F, Cl, $OCH_3$, $OCH_2CH_3$, and $C_1$ to $C_8$ alkyl, aryl, or arylalkyl groups; each $R_3$ is independently a $C_1$ to $C_8$ alkyl, aryl, or arylalkyl group; m is an integer from 0 to 4; and n is an integer from 2 to 4.

15. A liquid crystal device according to claim 14, wherein, in the organotrialkoxysilane additive, $R_1$ and $R_2$ are independently H, $CH_3$, or F; each $R_3$ is the same and is $CH_3$ or $CH_2CH_3$; m is 0 or 1; and n is 3 or 4.

16. A liquid crystal device according to claim 14, wherein the liquid crystal composite further comprises at least one second additive having the structure wherein $R_4$ is a $C_1$ to $C_{18}$ alkyl, aryl, or arylalkyl group; each $R_5$ is independently a $C_1$ to $C_8$ alkyl, aryl, or arylalkyl group; each $R_6$ is independently a $C_1$ to $C_{18}$ alkyl, aryl, or arylalkyl group; each $R_7$ is independently a $C_1$ to $C_8$ alkyl, aryl, or arylalkyl group; and each $R_8$ is independently a $C_1$ to $C_8$ alkyl, aryl, or arylalkyl group.

17. A liquid crystal device according to claim 14, which is an active matrix liquid crystal device.

18. A liquid crystal device according to claim 14, wherein the liquid crystal composition is operationally nematic and has a positive dielectric anisotropy.

19. A liquid crystal device according to claim 14, wherein the containment medium is poly(vinyl alcohol) or polyurethane.

20. A liquid crystal device according to claim 14, wherein the liquid crystal composition has a cyano content of less that 1.8 meq/g.

* * * * *